US011971674B2

(12) United States Patent
Nanno et al.

(10) Patent No.: US 11,971,674 B2
(45) Date of Patent: Apr. 30, 2024

(54) HEATING DEVICE, FIXING DEVICE, AND IMAGE FORMING APPARATUS

(71) Applicants: Shigeo Nanno, Kanagawa (JP); Yasunori Ishigaya, Kanagawa (JP); Takahiro Imada, Kanagawa (JP); Takumi Waida, Kanagawa (JP); Daisuke Hirano, Kanagawa (JP)

(72) Inventors: Shigeo Nanno, Kanagawa (JP); Yasunori Ishigaya, Kanagawa (JP); Takahiro Imada, Kanagawa (JP); Takumi Waida, Kanagawa (JP); Daisuke Hirano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/574,578

(22) Filed: Jan. 13, 2022

(65) Prior Publication Data

US 2022/0291615 A1 Sep. 15, 2022

(30) Foreign Application Priority Data

Mar. 10, 2021 (JP) ................................ 2021-038166
Sep. 13, 2021 (JP) ................................ 2021-148789

(51) Int. Cl.
*G03G 15/20* (2006.01)

(52) U.S. Cl.
CPC ..... *G03G 15/2057* (2013.01); *G03G 15/2064* (2013.01); *G03G 2215/2038* (2013.01)

(58) Field of Classification Search
None
See application file for complete search history.

(56) References Cited

U.S. PATENT DOCUMENTS

| | | | | |
|---|---|---|---|---|
| 2011/0062140 A1* | 3/2011 | Sakakibara | .......... | H05B 1/0241 219/539 |
| 2011/0129268 A1 | 6/2011 | Ishii et al. | | |
| 2011/0200368 A1 | 8/2011 | Yamaguchi et al. | | |
| 2011/0206427 A1 | 8/2011 | Iwaya et al. | | |
| 2011/0217095 A1 | 9/2011 | Ishii et al. | | |
| 2011/0229181 A1 | 9/2011 | Iwaya et al. | | |
| 2011/0229225 A1 | 9/2011 | Ishii et al. | | |
| 2012/0121306 A1* | 5/2012 | Shimura | .................. | H05B 3/06 399/329 |
| 2012/0308280 A1* | 12/2012 | Tsuruya | ............. | G03G 15/2028 399/329 |
| 2013/0343791 A1* | 12/2013 | Shimura | .................. | H05B 3/03 399/329 |

(Continued)

FOREIGN PATENT DOCUMENTS

| | | | | |
|---|---|---|---|---|
| JP | 11-084919 | 3/1999 | | |
| JP | 2014102429 A * | 6/2014 | ......... | G03G 15/2042 |

(Continued)

*Primary Examiner* — Sevan A Aydin
(74) *Attorney, Agent, or Firm* — XSENSUS LLP

(57) ABSTRACT

A heating device includes a rotator, a heater, a heater holder, and a first high thermal conduction member. The heater includes a base and a plurality of heat generators being arranged on the base and including neighboring heat generators. The heater has a gap area between the neighboring heat generators. The first high thermal conduction member has a higher thermal conductivity than the base and faces the gap area.

20 Claims, 15 Drawing Sheets

(56) References Cited

U.S. PATENT DOCUMENTS

| | | | | |
|---|---|---|---|---|
| 2014/0072353 | A1* | 3/2014 | Kim | G03G 15/2017 399/329 |
| 2015/0093162 | A1* | 4/2015 | Ishida | G03G 15/2053 399/328 |
| 2015/0139708 | A1* | 5/2015 | Shimura | G03G 15/2053 399/329 |
| 2015/0331373 | A1* | 11/2015 | Takagi | G03G 15/2053 399/334 |
| 2016/0085187 | A1* | 3/2016 | Takagi | G03G 15/2053 399/69 |
| 2017/0363995 | A1* | 12/2017 | Takagi | G03G 15/2053 |
| 2018/0253043 | A1* | 9/2018 | Shimura | H05B 3/0095 |
| 2019/0179242 | A1 | 6/2019 | Adachi et al. | |

FOREIGN PATENT DOCUMENTS

| | | |
|---|---|---|
| JP | 2019-105836 | 6/2019 |
| JP | 2020-091391 | 6/2020 |

* cited by examiner

HEATING DEVICE, FIXING DEVICE, AND IMAGE FORMING APPARATUS

CROSS-REFERENCE TO RELATED APPLICATIONS

This patent application is based on and claims priority pursuant to 35 U.S.C. § 119(a) to Japanese Patent Applications No. 2021-038166, filed on Mar. 10, 2021 and No. 2021-148789, filed on Sep. 13, 2021 in the Japan Patent Office, the entire disclosure of each of which is incorporated by reference herein.

BACKGROUND

Technical Field

Embodiments of the present disclosure generally relate to a heating device, a fixing device, and an image forming apparatus. In particular, the embodiments of the present disclosure relate to a heating device, a fixing device with the heating device for fixing a toner image on a recording medium, and an image forming apparatus with the fixing device for forming an image on a recording medium.

Related Art

One type of fixing device includes a fixing belt as a rotator and a planar heater including resistive heat generators on a base as a heating device heating the fixing belt. In such a fixing device, it is important to uniform a temperature distribution of the fixing belt in a longitudinal direction of the fixing belt (that is an arrangement direction of the plurality of resistive heat generators) and uniformly heat toner on a recording medium.

SUMMARY

This specification describes an improved heating device that includes a rotator, a heater, a heater holder, and a first high thermal conduction member. The heater includes a base and a plurality of heat generators being arranged on the base and including neighboring heat generators. The heater has a gap area between the neighboring heat generators. The first high thermal conduction member has a higher thermal conductivity than the base and faces the gap area.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
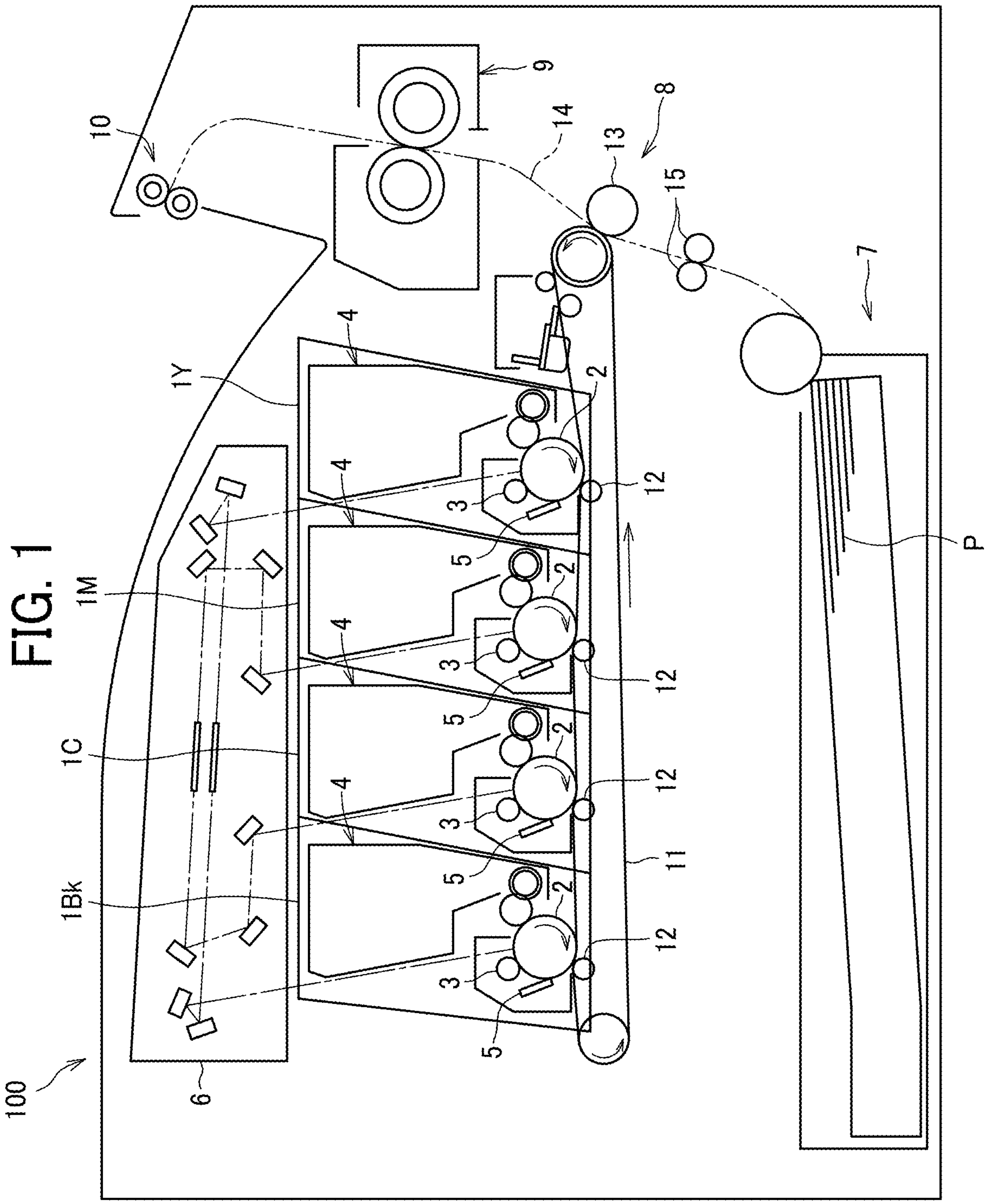
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

With reference to drawings attached, a description is given below of the present disclosure. In the drawings for illustrating embodiments of the present disclosure, identical reference numerals are assigned to elements such as members and parts that have an identical function or an identical shape as long as differentiation is possible, and descriptions of such elements may be omitted once the description is provided.

FIG. 1 is a schematic diagram illustrating a configuration of an image forming apparatus according to an embodiment of the present disclosure.

The image forming apparatus 100 illustrated in FIG. 1 includes four image forming units 1Y, 1M, 1C, and 1Bk detachably attached to an apparatus body thereof. The image forming units 1Y, 1M, 1C, and 1Bk have the same configuration except for containing different color developers, i.e., yellow (Y), magenta (M), cyan (C), and black (Bk) toners, respectively, corresponding to decomposed color separation components of full-color images. Each of the image forming units 1Y, 1M, 1C, and 1Bk includes a drum-shaped photoconductor 2 serving as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk including photoconductors 2 and the charging devices 3, the exposure devices 6, the transfer device 8, and the like configures an image forming device that forms an image on the sheet P.

The transfer device 8 includes an intermediate transfer belt 11 having an endless form and serving as an intermediate transferor, four primary transfer rollers 12 serving as primary transferors, a secondary transfer roller 13 serving as a secondary transferor. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip therebetween. On the other hand, the secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Next, a description is given of a series of print operations of the image forming apparatus 100 with reference to FIG. 1.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip at each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip at a time when the full color toner image formed on the intermediate transfer belt 11 reaches the secondary transfer nip. Accordingly, the full color toner image is transferred onto and borne on the sheet P. After the toner image is transferred from each of the photoconductors 2 onto the intermediate transfer belt 11, each of the cleaning devices 5 removes residual toner on each of the photoconductors 2.

After the full color toner image is transferred onto the sheet P, the sheet P is conveyed to the fixing device 9 to fix the toner image on the sheet P. Subsequently, the sheet ejection device 10 ejects the sheet P outside the image forming apparatus 100, and the series of print operations are completed.

Next, a configuration of the fixing device 9 is described.

Figure 2:
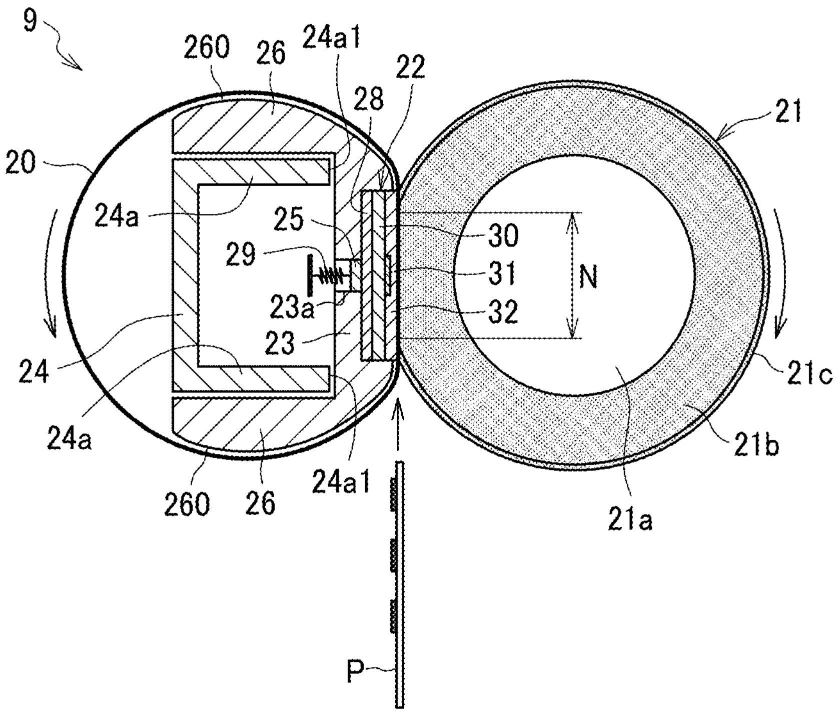
FIG. 2 is a schematic sectional view of a fixing device incorporated in the image forming apparatus of FIG. 1.

As illustrated in FIG. 2, the fixing device 9 according to the present embodiment includes a fixing belt 20 as a fixing rotator, a pressure roller 21 as an opposed rotator or a pressure rotator, a heater 22 as a heating member, a heater holder 23 as a holder, a stay 24 as a support, a thermistor 25 as a temperature detector, and a first high thermal conduction member 28. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28. The fixing belt 20, the pressure roller 21, the heater 22, the heater holder 23, the stay 24, and the first high thermal conduction member 28 extend in a direction perpendicular to the sheet surface of FIG. 2. Hereinafter, the direction is simply referred to as a longitudinal direction. Note that the longitudinal direction is also a width direction of the sheet P conveyed, a belt width direction of the fixing belt 20, and an axial direction of the pressure roller 21.

The fixing belt 20 includes, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE), and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or polytetrafluoroethylene (PTFE) as a slide layer.

The pressure roller 21 having, for example, an outer diameter of 25 mm, includes a solid iron cored bar **21*a*, an elastic layer 21*b* on the surface of the cored bar 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b*** to improve releasability.

A biasing member presses the pressure roller 21 against the fixing belt 20, and the pressure roller 21 presses against the heater 22 via the fixing belt 20 to form the fixing nip N between the fixing belt 20 and the pressure roller 21. A driver drives and rotates the pressure roller 21 in a direction indicated by arrow in FIG. 2, and this rotation of the pressure roller 21 rotates the fixing belt 20.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and the heat generated from the resistive heat generators 31 is transmitted to the fixing belt 20 through the insulation layer 32. Although the resistive heat generators 31 and the insulation layer 32 is disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with a material having a high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside a loop of the fixing belt 20. The stay 24 is configured by a channeled metallic member, and both side plates of the fixing device 9 support both end portions of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

When the stay 24 supports the heater holder 23, a surface of the heater holder 23 opposite the pressure roller 21 that is a left surface of the heater holder 23 in FIG. 2 contacts the stay 24 having a portion extending in the pressing direction of the pressure roller 21 (the lateral direction in FIG. 2) or a certain thick portion. Such a configuration reduces a bend of the heater holder 23 caused by the pressing force from the pressure roller 21, in particular, the bend in the longitudinal direction of the heater holder 23 in the present embodiment. However, the above-described contact includes not only the case where the stay 24 is in direct contact with the heater holder 23 but also the case where the stay 24 contacts the heater holder 23 via another member. The term "contact via another member" means a state in which another member is interposed between the stay 24 and the heater holder 23 in the lateral direction in FIG. 2 and at a position corresponding to at least a part of the member, the stay 24 contacts the member, and the member contacts the heater holder 23. The term "extending in the pressing direction" is not limited to a case where the portion of the stay 24 extends in the same direction as the pressing direction of the pressure roller 21 but includes the case where the portion of the stay 24 extends in a direction with a certain angle from the pressing direction of the pressure roller 21. Even in such cases, the stay 24 can reduce bending of the heater holder 23 under pressure from the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23. Thus, the heater 22 can effectively heat the fixing belt 20.

In addition, the heater holder 23 includes guides 26 configured to guide the fixing belt 20. The guides 26 include upstream guides upstream from the heater 22 (that is under the heater 22 in FIG. 2) and downstream guides downstream from the heater 22 (that is over the heater 22 in FIG. 2) in a belt rotation direction. The upstream guides and the downstream guides of the guides 26 are disposed at intervals in a longitudinal direction of the heater 22. Each guide 26 has a substantial fan shape and has a belt facing surface 260. The belt facing surface 260 faces the inner circumferential surface of the fixing belt 20 and is an arc-shaped or convex curved surface extending in a belt circumferential direction.

The heater holder 23 has a plurality of openings 23*a* arranged in the longitudinal direction. The openings 23*a* extend through the heater holder 23 in the thickness direction thereof. The thermistor 25 and a thermostat which is described later are disposed in the openings 23*a*. The spring 29 presses the thermistor 25 and the thermostat against the back surface of the first high thermal conduction member 28. However, the first high thermal conduction member 28 (and a second high thermal conduction member described later) may have openings similar to the openings 23*a* to press the thermistor 25 and the thermostat against the back surface of the base 30.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity is measured using a thermal diffusivity/conductivity measuring device (trade name: ai-Phase Mobile 1u, manufactured by Ai-Phase co., ltd.).

In order to convert the thermal diffusivity into thermal conductivity, values of density and specific heat capacity are necessary.

The density is measured by a dry automatic densitometer (trade name: Accupyc 1330 manufactured by Shimadzu Corporation).

The specific heat capacity is measured by a differential scanning calorimeter (trade name: DSC-60 manufactured by Shimadzu Corporation), and sapphire is used as a reference material in which the specific heat capacity is known. In the present embodiment, the specific heat capacity is measured five times, and an average value at 50° C. is used. The thermal conductivity λ is obtained by the following formula (1).

$$\lambda=\rho\times C\times\alpha \quad (1)$$

where ρ is the density, C is the specific heat capacity, and a is the thermal diffusivity obtained by the thermal diffusivity measurement described above.

When printing starts in the fixing device 9 according to the present embodiment, the pressure roller 21 is driven to rotate, and the fixing belt 20 starts to be rotated. The belt facing surface 260 of the guide 26 contacts and guides the inner circumferential surface of the fixing belt 20 to stably and smoothly rotates the fixing belt 20. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P. The fixing belt 20 is a heated member heated by the heater 22.

Figure 3:
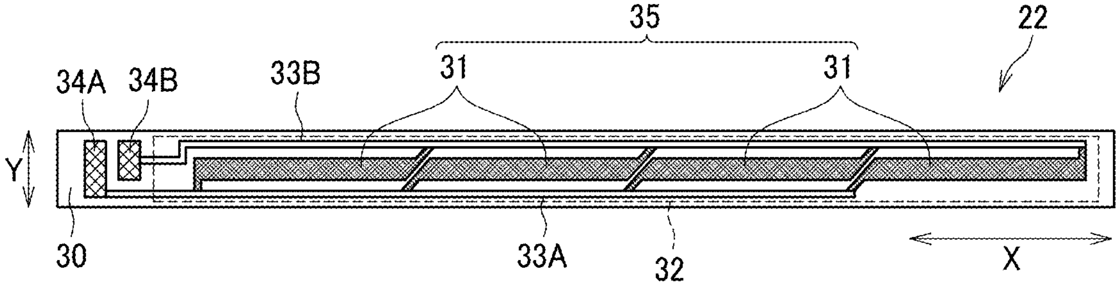
FIG. 3 is a plan view of a heater.

FIG. 3 is a plan view of the heater according to the present embodiment.

As illustrated in FIG. 3, the heater 22 includes a plurality of resistive heat generators 31 (four resistive heat generators 31), power supply lines 33A and 33B that are conductors, a first electrode 34*a*, and a second electrode 34*b* that are disposed on the surface of the planar base 30. However, the number of resistive heat generators 31 is not limited to four in the present embodiment.

In the present embodiment, the longitudinal direction of the heater 22 and the like (that is the direction perpendicular to the surface of the paper on which FIG. 2 is drawn) is also an arrangement direction X in which the plurality of resistive heat generators 31 are arranged as illustrated in FIG. 3. Hereinafter, the direction X is also simply referred to as the arrangement direction. In addition, a direction that intersects the arrangement direction of the plurality of resistive heat generators and is different from a thickness direction of the base 30 is referred to as a direction intersecting the arrangement direction. In the present embodiment, the direction intersecting the arrangement direction is the vertical direction Y in FIG. 3. The direction Y intersecting the arrangement direction is a direction along the surface of the base 30 on which the resistive heat generators 31 are disposed and is also a short-side direction of the heater 22 and a conveyance direction of the sheet passing through the fixing device 9.

The plurality of resistive heat generators 31 configure a plurality of heat generation portions 35 divided in the arrangement direction. The resistive heat generators 31 are electrically coupled in parallel to a pair of electrodes 34A and 34B disposed on one end of the base 30 in the arrangement direction (that is a left end of the base 30 in FIG. 3) via the power supply lines 33A and 33B. The power supply lines 33A and 33B are made of conductors having an electrical resistance value smaller than the electrical resistance value of the resistive heat generators 31. A gap area between neighboring resistive heat generators 31 is preferably 0.2 mm or more, more preferably 0.4 mm or more from the viewpoint of maintaining the insulation between the neighboring resistive heat generators 31. However, too large the gap area between the neighboring resistive heat generators 31 is likely to cause temperature decrease in the gap. Accordingly, from the viewpoint of reducing the temperature unevenness in the arrangement direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases (the heater output decreases) as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. The region outside the small sheet is referred to as a non-sheet passing region. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions that are end portions of the fixing belt outside the small sheets. Electrically coupling the plurality of resistive heat generators 31 in parallel can restrain temperature rise in the non-sheet passing region while maintaining the print speed. The heat generator that configures the heat generation portion 35 may not be the resistive heat generator having the PTC characteristic. The resistive heat generators may be arranged in a plurality of rows in the direction intersecting the arrangement direction in the heaters 22.

For example, the resistive heat generators 31 are produced as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide (RuO2), other than the above material. Silver (Ag), silver palladium (AgPd) or the like may be used as a material of the power supply lines 33 and the electrodes 34. Screen-printing such a material forms the power supply lines 33 and the electrodes 34. The power supply lines 33 are made of conductors having an electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment uses an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers, insulates, and protects the resistive heat generators 31 and the power supply lines 33, and additionally retains slidability with the fixing belt 20.

Figure 4:
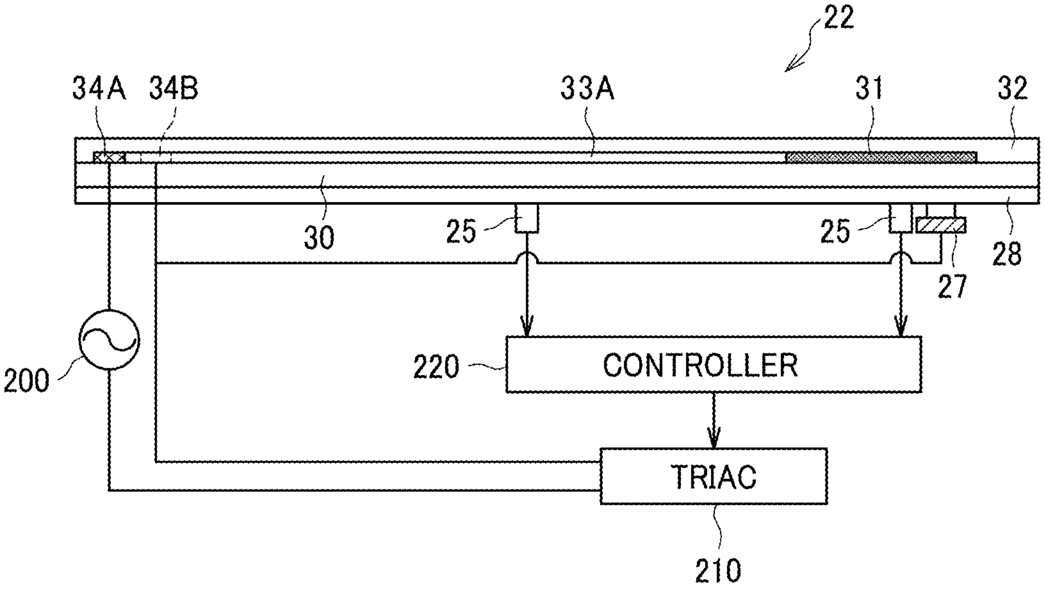
FIG. 4 is a schematic diagram illustrating a circuit to supply power to the heater according to the embodiment of the present disclosure.

FIG. 4 is a schematic diagram illustrating a circuit to supply power to the heater according to the present embodiment.

As illustrated in FIG. 4, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls the amount of power supplied. The controller 220 controls an amount of power supplied to the resistive heat generators 31 via a triac 210 based on temperatures detected by the thermistors 25. A controller 220 is configured by a microcomputer including a central processing unit (CPU), a read only memory (ROM), a random-access memory (RAM), an input and output (I/O) interface, and the like.

In the present embodiment, one thermistor 25 is disposed in the central region in the arrangement direction of the heaters 22 that is the region inside a sheet conveyance span for the smallest sheet, and the other thermistor 25 is disposed in one end portion of the heater 22 in the arrangement direction. The thermostat 27 as a power cut-off device is disposed in the one end portion of the heater 22 in the arrangement direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

Figure 5:
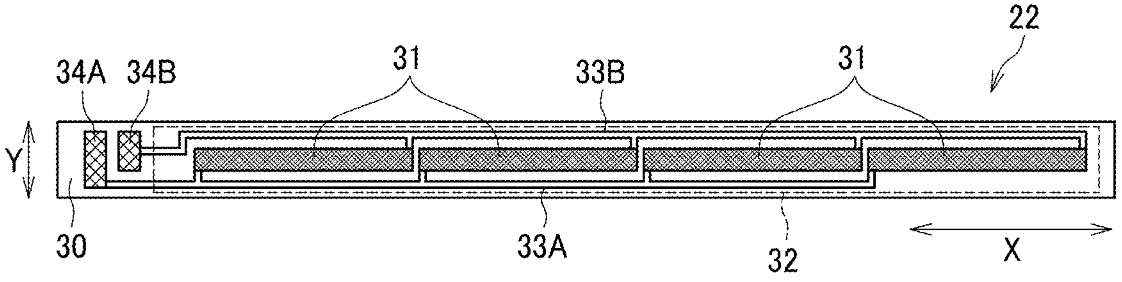
FIG. 5 is a plan view of a heater including resistive heat generators each having a form different from the form of the resistive heat generator illustrated in FIG. 3.
Figure 6:
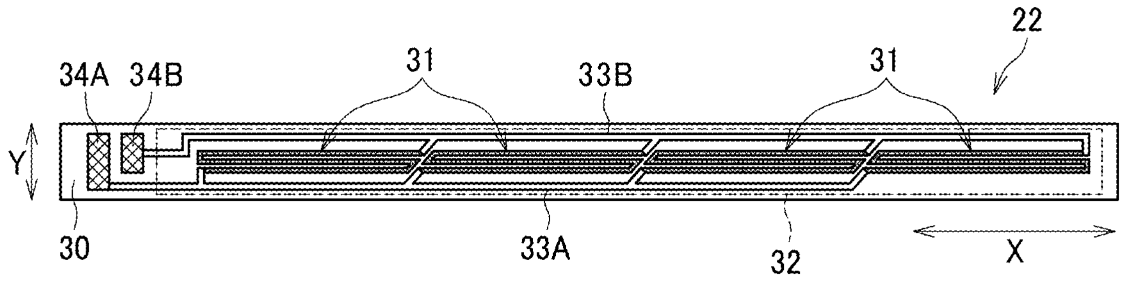
FIG. 6 is a plan view of a heater including resistive heat generators each having a form different from each of the forms of the resistive heat generators illustrated in FIGS. 3 and 5.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 5, the shape of resistive heat generator 31 may be a rectangular shape, or as illustrated in FIG. 6, the resistive heat generator 31 may be configured by a linear portion folding back to form a substantially parallelogram shape. In addition, as illustrated in FIG. 5, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 7:
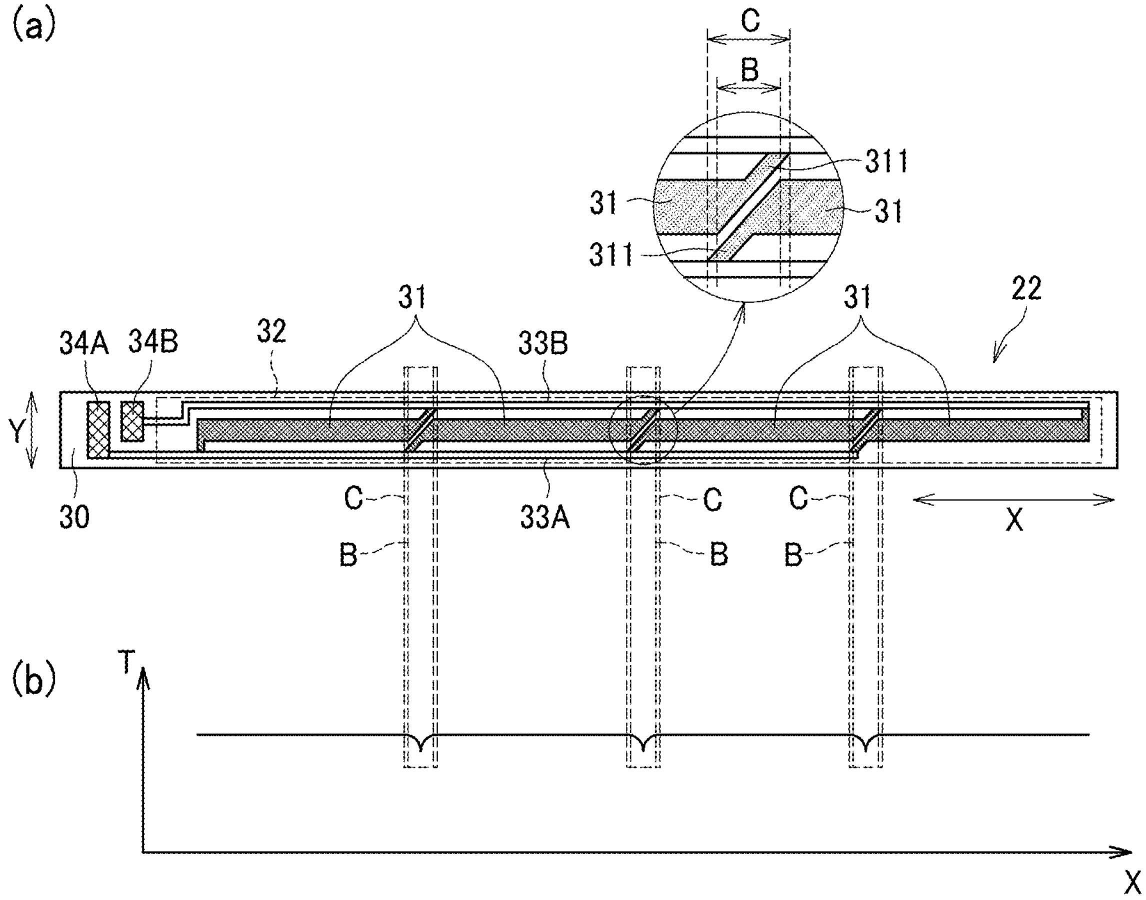
FIG. 7 is a diagram illustrating a temperature distribution of a fixing belt in an arrangement direction of the resistive heat generators of the heater, including (*a*) a plan view of the heater and (*b*) a graph illustrating the temperature distribution of the fixing belt.

FIG. 7 is a diagram illustrating a temperature distribution of the fixing belt 20 in the arrangement direction. FIG. 7 (*a*) is a diagram illustrating an arrangement of the resistive heat generators 31 of the heater 22. FIG. 7 (*b*) is a graph, a vertical axis represents the temperature T of the fixing belt 20, and a horizontal axis represents the position of the fixing belt 20 in the arrangement direction.

As illustrated in FIGS. 7 (*a*) and 7 (*b*), the plurality of resistive heat generators 31 of the heater 22 are separated from each other in the arrangement direction to form separation areas B including gap areas between the resistive heat generators 31. In other words, the heater 22 has gap areas between the plurality of resistive heat generators 31. As illustrated in an enlarged view of FIG. 7 (*a*), the separation area B includes the entire gap area sandwiched by the neighboring resistive heat generators 31. In addition, the separation area B includes parts of the resistive heat generators sandwiched between lines extending in a direction orthogonal to the arrangement direction from both ends of the gap area in the arrangement direction of the resistive heat generators 31. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 on the separation area B becomes smaller than the temperature of the fixing belt 20 on another area, which causes temperature unevenness in the arrangement direction of the fixing belt 20 as illustrated in FIG. 7 (*b*). Similarly, the temperature of the heater 22 on the separation area B becomes smaller than the temperature of the heater 22 on another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 7 (*a*). The connection portion 311 is defined as a portion of the resistive heat generator 31 that extends in the direction intersecting the arrangement direction and is connected to one of the power supply lines 33A and 33B. Similar to the separation area B, the temperature of the heater 22 on the enlarged separation area C and the temperature of the fixing belt 20 on the enlarged separation area C are smaller than the temperatures of the heater 22 and the fixing belt 20 on another area of the heat generation portion 35.

Figure 8:
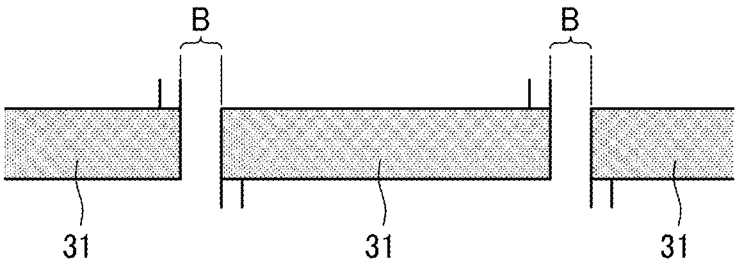
FIG. 8 is a diagram illustrating separation areas of the heater of FIG. 5.
Figure 9:
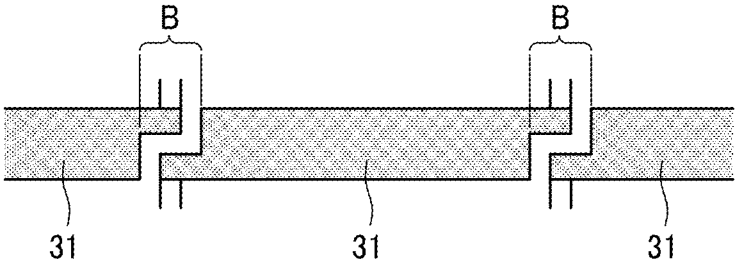
FIG. 9 is a diagram illustrating separation areas each having a form different from the form of the separation area of FIG. 8.
Figure 10:
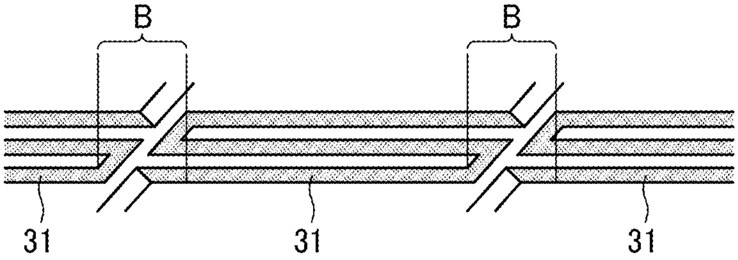
FIG. 10 is a diagram illustrating separation areas of the heater of FIG. 6.

As illustrated in FIG. 8, the heater 22 including the rectangular resistive heat generators 31 illustrated in FIG. 5 also has the separation areas B having lower temperatures than another area of the heat generation portion 35. In addition, a heater 22 including resistive heat generators 31 having forms as illustrated in FIG. 9 has the separation areas B with lower temperatures than another area of the heat generation portion 35. As illustrated in FIG. 10, the heater 22 including the resistive heat generators 31 having forms as illustrated in FIG. 6 has the separation areas B with lower temperatures than another area of the heat generation portion 35. However, overlapping the resistive heat generators 31 lying next to each other in the arrangement direction as illustrated in FIGS. 7, 9, and 10 can reduce the above-described temperature drop that the temperature of the fixing belt 20 above the separation area B is smaller than the temperature of the fixing belt 20 above an area other than the separation area B.

The fixing device 9 in the present embodiment includes the first high thermal conduction member 28 described above in order to reduce the temperature drop on the separation area B as described above and reduce the temperature unevenness in the arrangement direction of the fixing belt 20. Next, a detailed description is given of the first high thermal conduction member 28.

As illustrated in FIG. 2, the first high thermal conduction member 28 is disposed between the heater 22 and the stay 24 in the left-right direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two rectangular portions 24*a* extending in a thickness direction of the heater 22 and each having a contact surface 24*a*1 that contacts the back side of the heater holder 23 to support the heater holder 23, the first high thermal conduction member 28, and the heater 22. In the direction intersecting the arrangement direction that is the vertical direction in FIG. 2, the contact surfaces 24*a*1 are outside the resistive heat generators 31. The above-described structure prevents heat transfer from the heater 22 to the stay 24 and enables the heater 22 to effectively heat the fixing belt 20.

Figure 11:
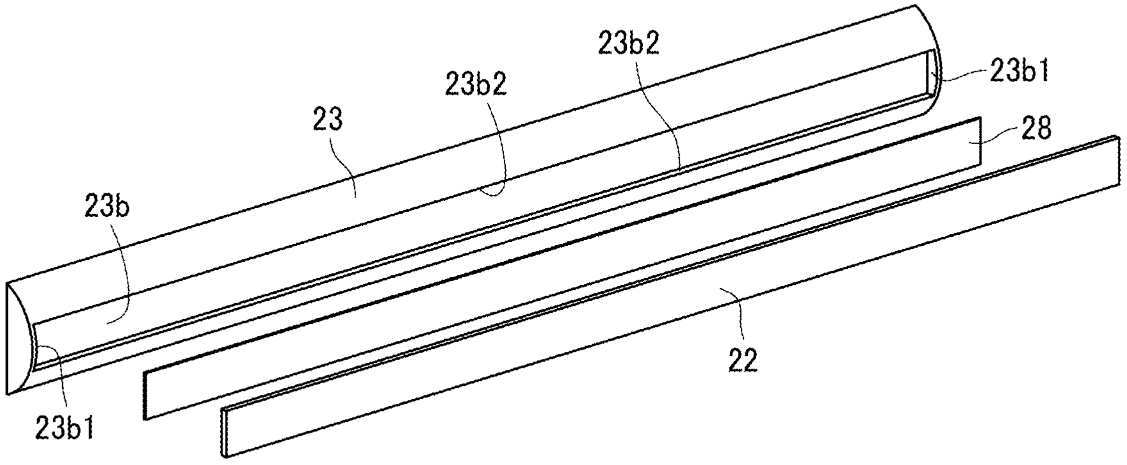
FIG. 11 is a perspective view of a heater, a first high thermal conduction member, and a heater holder.

As illustrated in FIG. 11, the first high thermal conduction member 28 is a plate having a thickness of 0.3 mm, a length of 222 mm in the arrangement direction, and a width of 10 mm in the direction intersecting the arrangement direction. In the present embodiment, the first high thermal conduction member 28 is made of a single plate but may be made of a plurality of members. In FIG. 11, the guide 26 in FIG. 2 is omitted.

The first high thermal conduction member 28 is fitted into the recessed portion 23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the arrangement direction is substantially the same as the length of the heater 22 in the arrangement direction. Both side walls 23*b*1 forming the recessed portion 23*b* in the arrangement direction restrict movement of the heater 22 and movement of the first high thermal conduction member 28 in the arrangement direction and work as arrangement direction regulators. Reducing the positional deviation of the first high thermal conduction member 28 in the arrangement direction in the fixing device 9 improves the thermal conductivity efficiency with respect to a target range in the arrangement direction. In addition, both side walls 23*b*2 forming the recessed portion 23*b* in the direction intersecting the arrangement direction restricts movement of the heater 22 and movement of the first high thermal conduction member 28 in the direction intersecting the arrangement direction.

Figure 12:
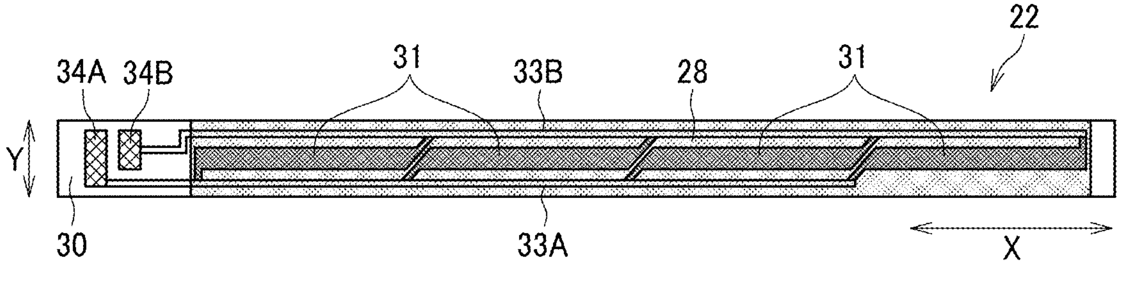
FIG. 12 is a plan view of the heater to illustrate an arrangement of the first high thermal conduction member.
Figure 28:
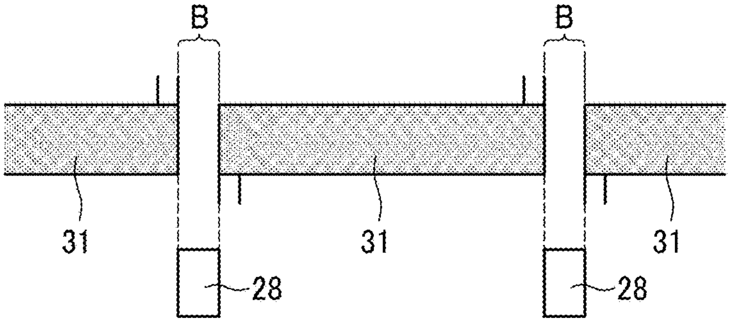
FIG. 28 is a plan view of a heater having a different arrangement of the first high thermal conduction members.
Figure 29:
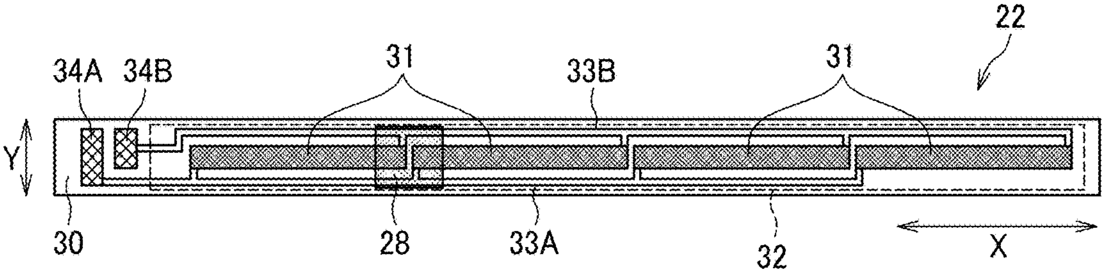
FIG. 29 is a plan view of a heater having a further different arrangement of the first high thermal conduction member.

The range in which the first high thermal conduction member 28 is disposed in the arrangement direction is not limited to the above. For example, as illustrated in FIG. 12, the first high thermal conduction member 28 may be disposed so as to face a range corresponding to the heat generation portion 35 in the arrangement direction (see a hatched portion in FIG. 12). As illustrated in FIG. 28, the first high thermal conduction members 28 may face the entire gap area between the resistive heat generators 31. In FIG. 28, for the sake of convenience, the resistive heat generator 31 and the first high thermal conduction member 28 are shifted in the vertical direction of FIG. 28 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 29, which is described below. As illustrated in FIG. 29, the first high thermal conduction member 28 may face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 29, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency in the arrangement direction of the heaters 22. The first high thermal conduction member 28 disposed opposite the separation area B improve the heat conduction efficiency of a part of the heater 22 facing the separation area B in the arrangement direction, transmits heat to the part of the heater 22 facing the separation area B, and raise the temperature of the part of the heater 22 facing the separation area B. As a result, the first high thermal conduction member 28 reduces the temperature unevenness in the arrangement direction of the heaters 22. Thus, temperature unevenness in the arrangement direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the arrangement direction improves the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

In the present embodiment, the combination of the first high thermal conduction member 28 and the resistive heat generator 31 having the PTC characteristic described above effectively prevents the overheating of a non-sheet passing region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively prevented.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C as illustrated in FIG. 8 particularly improves the heat transfer efficiency of the separation area B and the area around the separation area B in the arrangement direction and reduces the temperature unevenness in the arrangement direction of the heaters 22. In particular, the first high thermal conduction member 28 facing the entire region of the heat generation portion 35 in the arrangement direction reduces the temperature unevenness of the heater 22 (and the fixing belt 20) in the arrangement direction.

Next, different embodiments of the fixing device is described.

Figure 13:
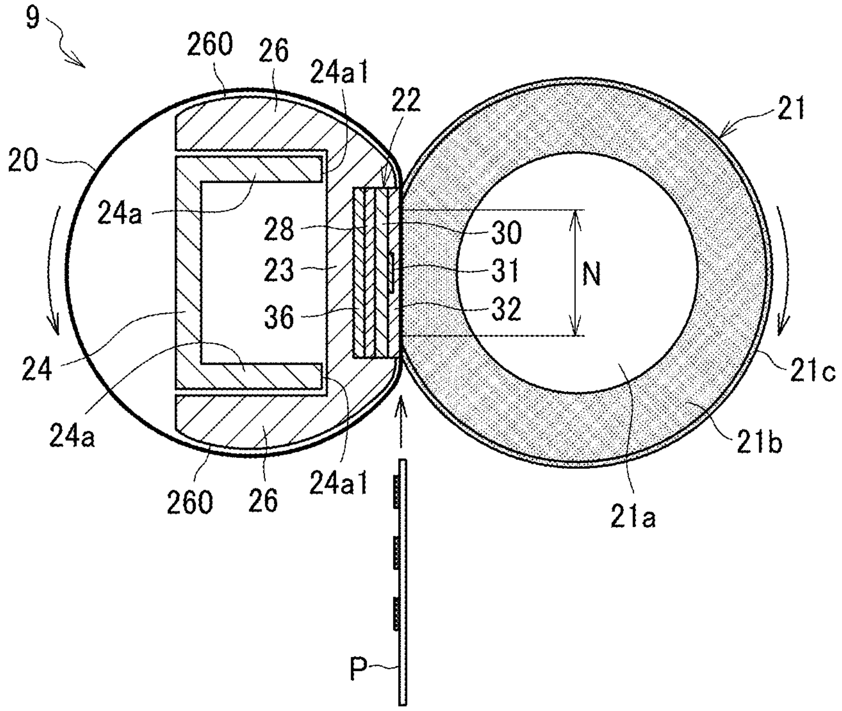
FIG. 13 is a schematic sectional view of a fixing device according to an embodiment different from FIG. 2.

As illustrated in FIG. 13, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 13 that is a direction in which the heater holder 23, the stay 24, and the first high thermal conduction member 28 are layered. Specifically, the second high thermal conduction member 36 is disposed so as to overlap the first high thermal conduction member 28. FIG. 13 illustrates a schematic cross section of the fixing device 9 including the second high thermal conduction member 36 that transmits heat in the arrangement direction, and the position of the schematic cross section is different from the position of the thermistor 25, which are different from FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 14:
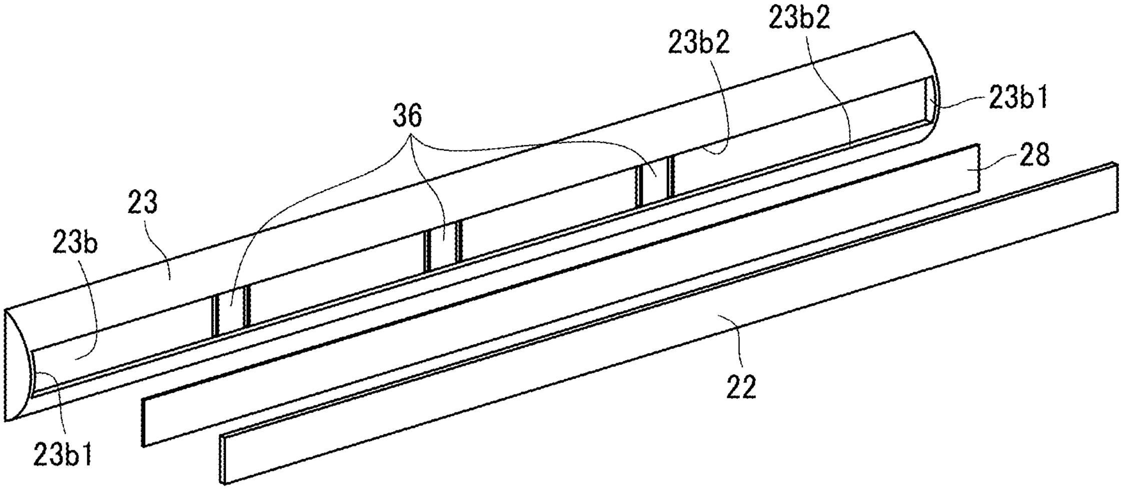
FIG. 14 is a perspective view of the heater, the first high thermal conduction member, a second high thermal conduction member, and the heater holder.

As illustrated in FIG. 14, a plurality of the second high thermal conduction members 36 are disposed on a plurality of portions of the heater holder 23 in the arrangement direction. The recessed portion **23*b* of the heater holder 23 has a plurality of holes in which the second high thermal conduction members 36 are disposed. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20. In FIG. 14, the guide 26 in FIG. 2** is omitted.

Figure 15:
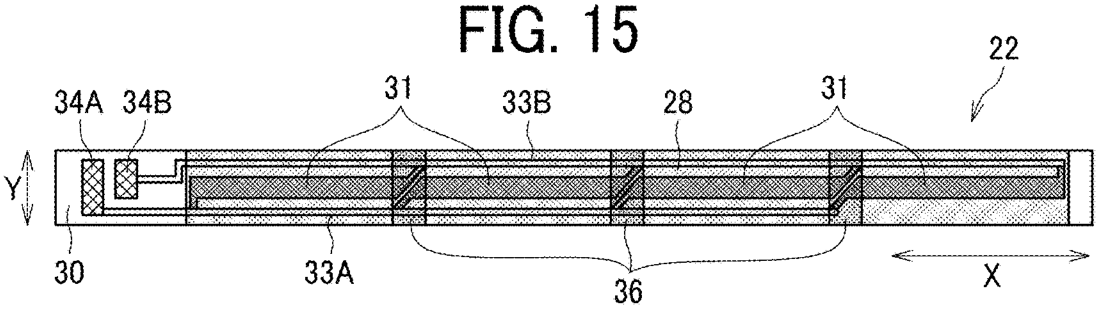
FIG. 15 is a plan view of the heater to illustrate an arrangement of the first high thermal conduction member and the second high thermal conduction member.

As illustrated in FIG. 15, each of the second high thermal conduction members 36 (see the hatched portions) is disposed at a position corresponding to the separation area B in the arrangement direction and faces at least a part of each of the neighboring resistive heat generators 31 in the arrangement direction. In particular, each of the second high thermal conduction members 36 in the present embodiment faces the entire separation area B. In FIG. 15 (and FIG. 16 to be described later), the first high thermal conduction member 28 faces the heat generation portion 35 extending in the arrangement direction, but the first high thermal conduction member 28 according to the present embodiment is not limited this as described above.

Figure 30:
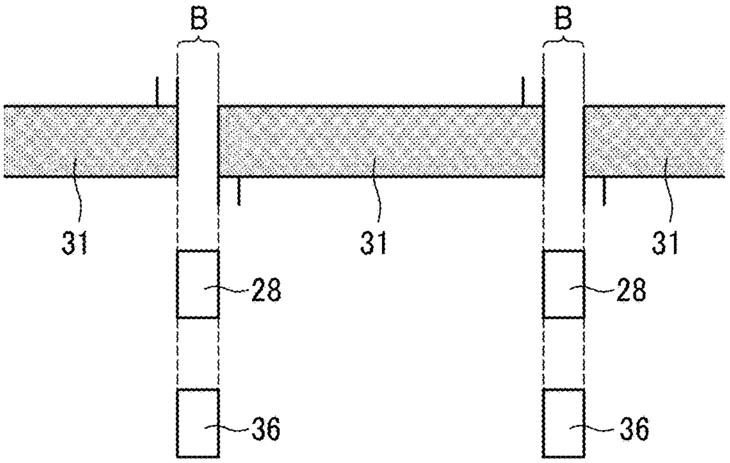
FIG. 30 is a plan view of a heater having a different arrangement of the first high thermal conduction members and the second high thermal conduction members.

The fixing device 9 according to the present embodiment includes the second high thermal conduction member 36 disposed at a position corresponding to the separation area B in the arrangement direction and a position at which at least a part of each of the neighboring resistive heat generators 31 faces the second high thermal conduction member 36 in addition to the first high thermal conduction member 28. The above-described structure particularly improves the heat transfer efficiency in the separation area B in the arrangement direction and further reduce the temperature unevenness of the heater 22 in the arrangement direction. As illustrated in FIG. 30, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 30, for the sake of convenience, the resistive heat generator 31, the first high thermal conduction member 28, and the second high thermal conduction member 36 are shifted in the vertical direction of FIG. 30 but are disposed at substantially the same position in the direction intersecting the arrangement direction. However, the present disclosure is not limited to the above. The first high thermal conduction member 28 and the second high thermal conduction member 36 may be disposed opposite a part of the resistive heat generators 31 in the direction intersecting the arrangement direction or may be disposed so as to cover the entire resistive heat generators 31 in the direction intersecting the arrangement direction.

In one embodiment different from the embodiments described above, the first high thermal conduction member 28 and the second high thermal conduction member 36 are made of a graphene sheet. The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 31:
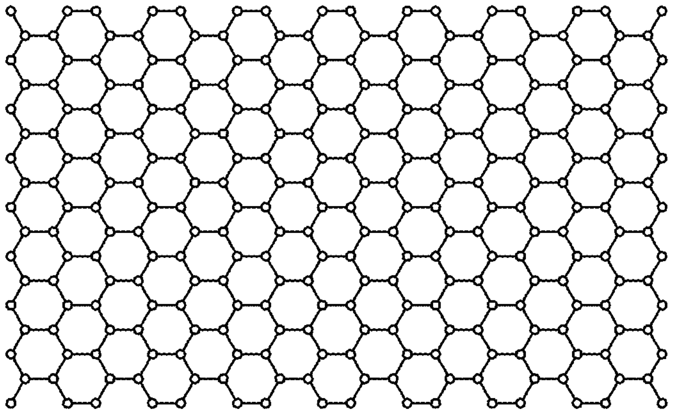
FIG. 31 is a schematic diagram illustrating a two-dimensional atomic crystal structure of graphene.

Graphene is a flaky powder. Graphene has a planar hexagonal lattice structure of carbon atoms, as illustrated in FIG. 31. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 32:
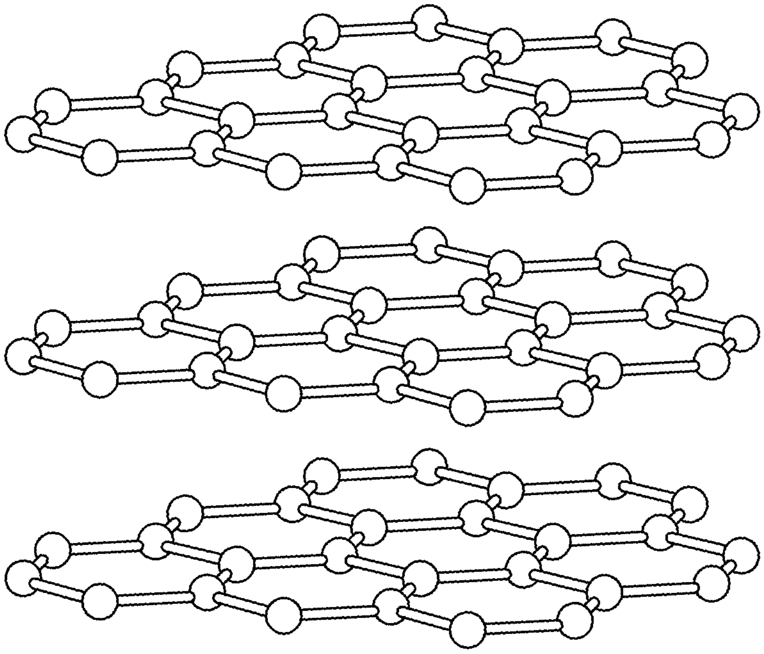
FIG. 32 is a schematic diagram illustrating a three-dimensional atomic crystal structure of graphite.

Graphite obtained by multilayering graphene has a large thermal conduction anisotropy. As illustrated in FIG. 32, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer and a multilayer portion.

Figure 16:
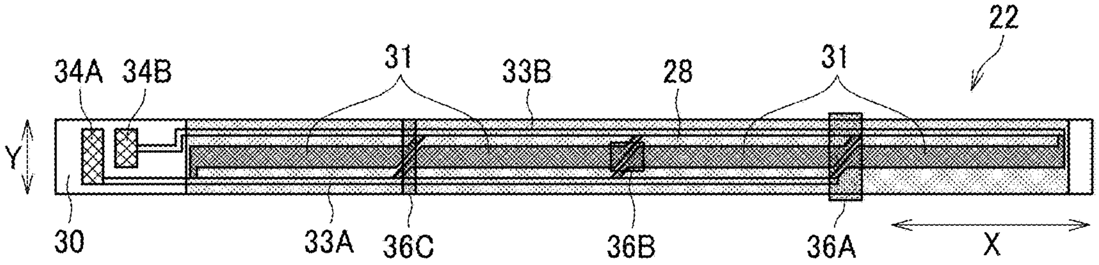
FIG. 16 is a plan view of a heater having an arrangement of the second high thermal conduction member different from the arrangement in FIG. 15.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 15. For example, as illustrated in FIG. 16, the second high thermal conduction member 36A is longer than the base 30 in the direction intersecting the arrangement direction, and both ends of the second high thermal conduction member 36A in the direction intersecting the arrangement direction are outside the base 30 in FIG. 16. The second high thermal conduction member 36B is opposite a range in which the resistive heat generator 31 is disposed in the direction intersecting the arrangement direction. The second high thermal conduction member 36C faces a part of the gap area and a part of each of neighboring resistive heat generators 31.

Figure 17:
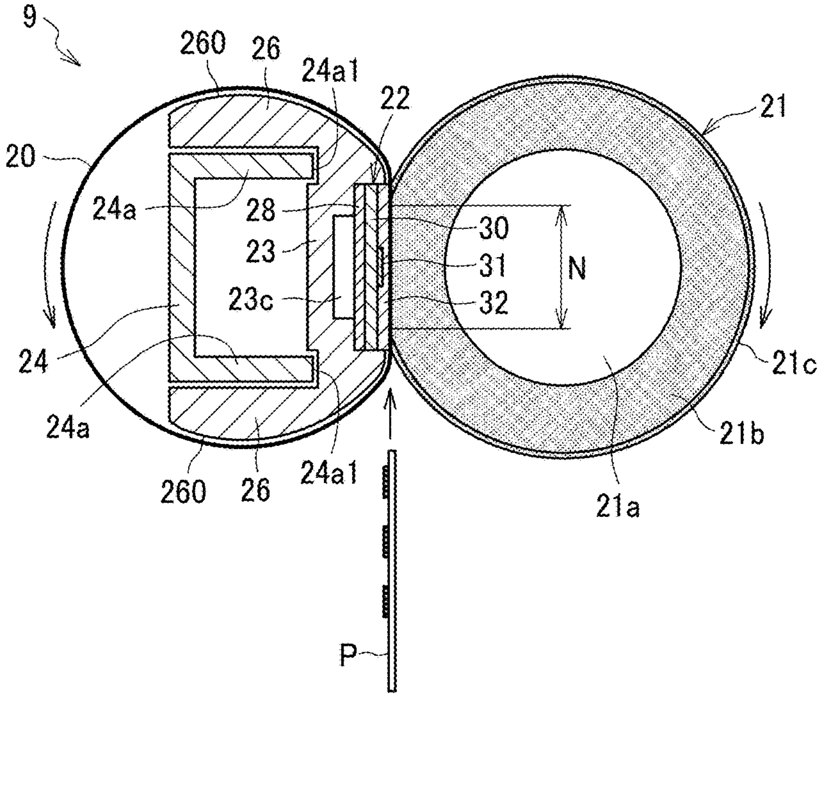
FIG. 17 is a schematic sectional view of a fixing device according to an embodiment different from each of FIGS. 2 and 13.

As illustrated in FIG. 17, the fixing device according to the present embodiment has a gap between the first high thermal conduction member 28 and the heater holder 23 in the thickness direction that is the lateral direction in FIG. 17. In other words, the fixing device 9 has a gap 23*c* serving as a thermal insulation layer. In the arrangement direction, the gap 23*c* is in a portion included in the recessed portion 23*b* (see FIG. 14) in the heater holder 23 to set the first high thermal conduction member 28 and the second high thermal conduction member 36 but the portion in which the second high thermal conduction member 36 is not set. In the direction intersecting the arrangement direction, the gap 23*c* is in a portion of the recessed portion 23*b* having a depth deeper than other portions to receive the first high thermal conduction member 28. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 13 of the above-described embodiment.

In particular, the fixing device 9 according to the present embodiment has the gap 23*c* facing the entire area of the resistive heat generators 31 in the direction intersecting the arrangement direction that is the vertical direction in FIG. 17. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

The above-described embodiments are illustrative and do not limit the present disclosure. It is therefore to be understood that within the scope of the appended claims, numerous additional modifications and variations are possible to this disclosure otherwise than as specifically described herein.

Figure 18:
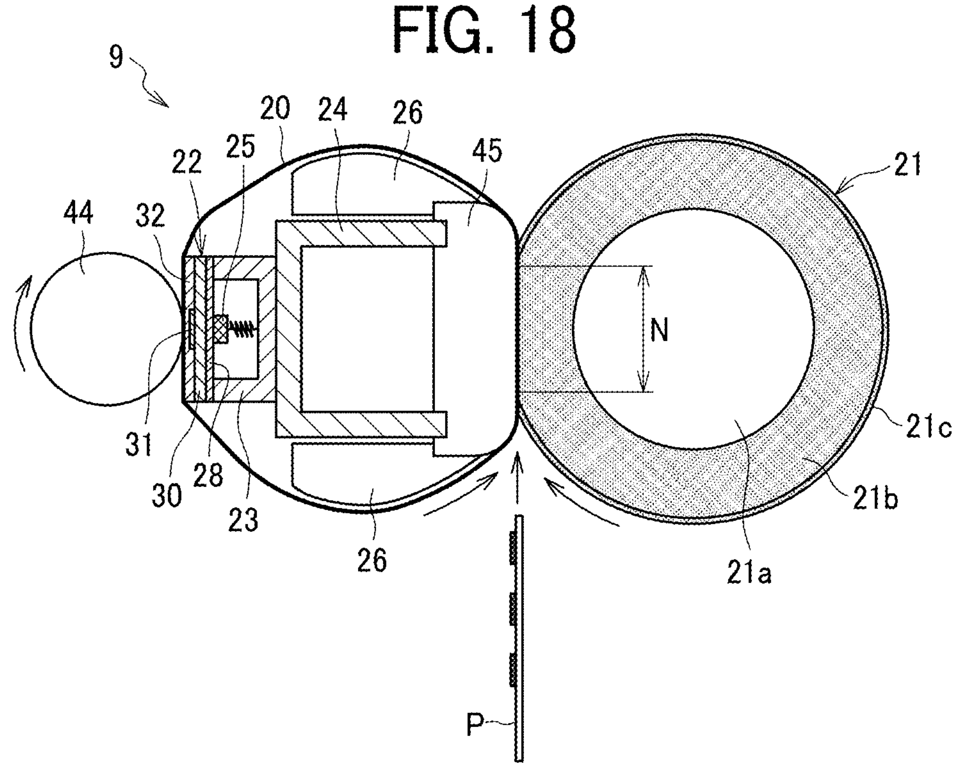
FIG. 18 is a schematic sectional view of a fixing device different from the above fixing devices.
Figure 19:
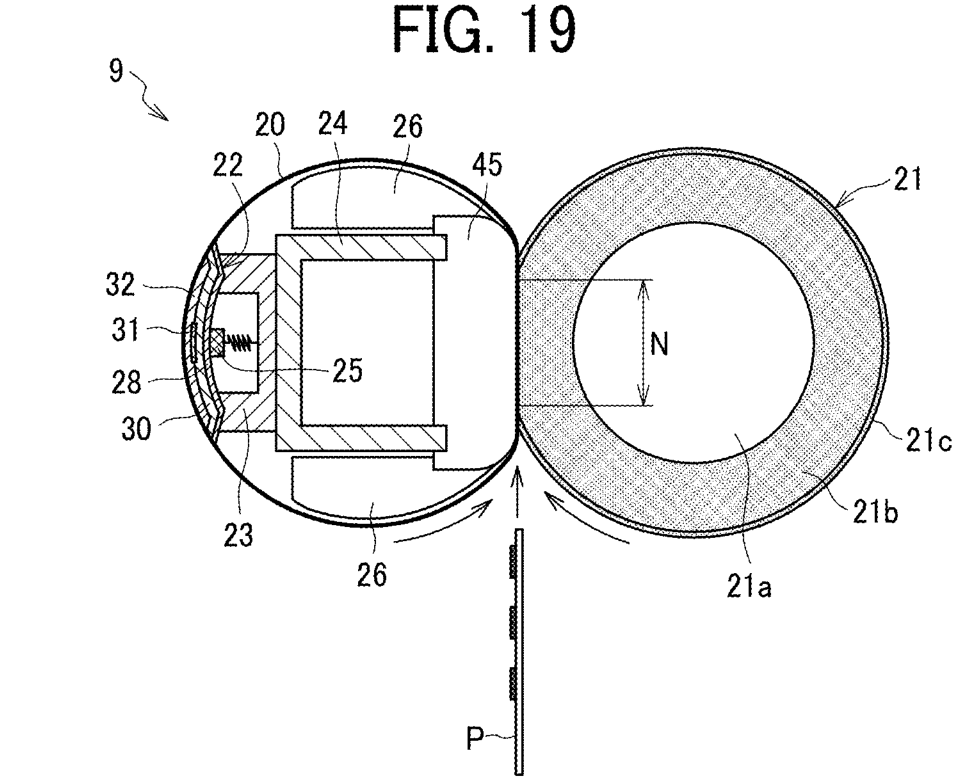
FIG. 19 is a schematic sectional view of a fixing device different from the above fixing devices.
Figure 20:
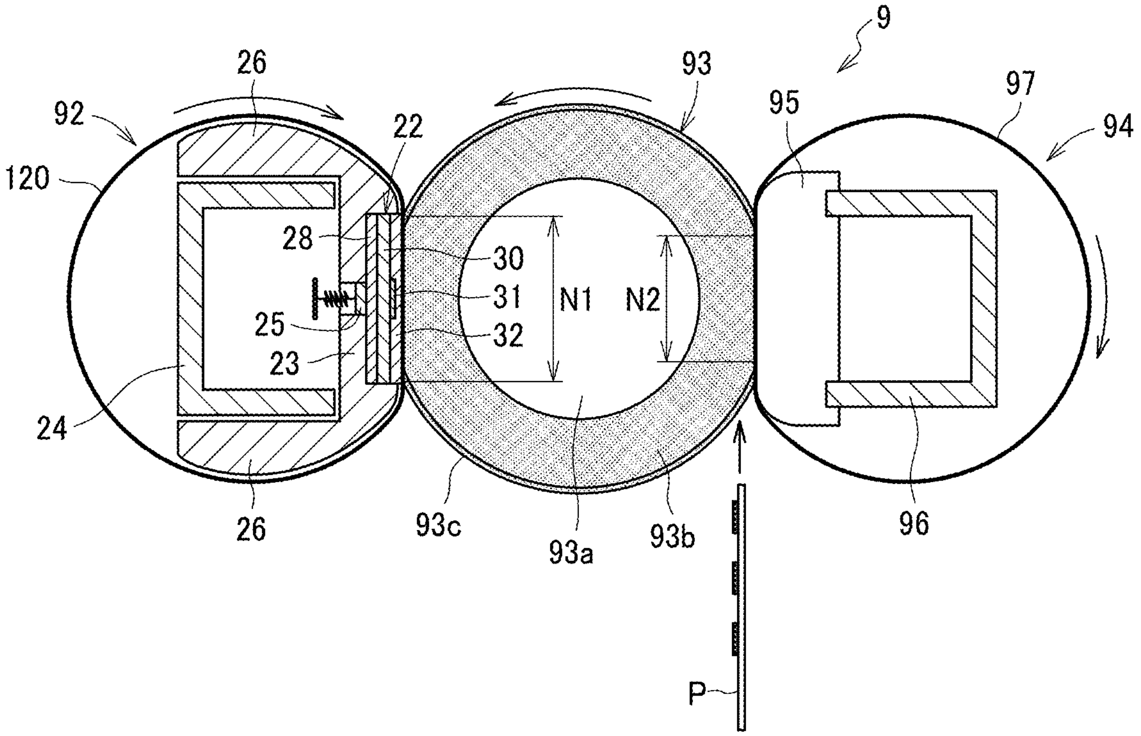
FIG. 20 is a schematic sectional view of a fixing device different from the above fixing devices.

The embodiments of the present disclosure are also applicable to fixing devices as illustrated in FIGS. 18 to 20, respectively, other than the fixing device 9 described above. The configurations of fixing devices illustrated in FIGS. 18 to 20 are briefly described below.

First, the fixing device 9 illustrated in FIG. 18 includes a pressurization roller 44 opposite the pressure roller 21 with respect to the fixing belt 20. The pressurization roller 44 is an opposed rotator that rotates opposite the fixing belt 20 as the rotator. The fixing belt 20 is sandwiched by the pressurization roller 44 and the heater 22 and heated by the heater 22. On the other hand, a nip formation pad 45 serving as a nip former is disposed inside the loop formed by the fixing belt 20 and disposed opposite the pressure roller 21. The nip formation pad 45 is supported by the stay 24. The nip formation pad 45 sandwiches the fixing belt 20 together with the pressure roller 21, thereby forming the fixing nip N.

Next, the fixing device 9 illustrated in FIG. 19 omits the above-described pressurization roller 44 and includes the heater 22 formed to be arc having a curvature of the fixing belt 20 to keep a circumferential contact length between the fixing belt 20 and the heater 22. The fixing device 9 illustrated in FIG. 19 is identical to the fixing device 9 illustrated in FIG. 18 in terms of the others.

Finally, the fixing device 9 illustrated in FIG. 20 is described. The fixing device 9 includes a heating assembly 92, a fixing roller 93 that is a fixing member, and a pressure assembly 94 that is a facing member. The heating assembly 92 includes the heater 22, the first high thermal conduction member 28, the heater holder 23, the stay 24, which are described in the above embodiments, and the heating belt 120. The fixing roller 93 is an opposed rotator that rotates opposite the heating belt 120 as the rotator. The fixing roller 93 includes a core 93*a*, an elastic layer 93*b*, and a release layer 93*c*. The core 93*a* is a solid core made of iron. The elastic layer 93*b* coats the circumferential surface of the core 93*a*. The release layer 93*c* coats an outer circumferential surface of the elastic layer 93*b*. In addition, the fixing device 9 includes a pressure assembly 94 opposite the heating assembly 92 via the fixing roller 93. The pressure assembly 94 includes a nip formation pad 95 and a stay 96 inside a loop of a pressure belt 97, and the pressure belt 97 is rotatably arranged to wrap around the nip formation pad 95 and the stay 96. The sheet P passes through the fixing nip N2 between the pressure belt 97 and the fixing roller 93 and is applied to heat and pressure, and the image is fixed on the sheet P.

The above-described fixing devices in FIGS. 18 to 20 also includes the resistive heat generators 31 in the heater 22 and has the separation area B between the resistive heat generators 31, and the separation area B similarly generates a smaller heat amount than the other area of the resistive heat generator 31 and causes temperature unevenness of the heater 22 and the fixing member in the arrangement direction. As in the above-described embodiments, disposing at least one of the first high thermal conduction member 28 or the second high thermal conduction member 36 opposite the gap area between neighboring resistive heat generators 31 of the heater 22 and a part of each of the neighboring resistive heat generators 31 reduces the temperature unevenness of the heater 22 and the rotator. Therefore, the above-described structure prevents fixing unevenness and gloss unevenness in the image fixed on the sheet passing through the fixing device. Since the heater 22 does not need to generate additional heat to secure sufficient fixing performance in the part of the heater 22 facing the separation area B between the resistive heat generators 31, energy consumption of the fixing device 9 can be saved.

A heating device according to the present disclosure is not limited to the fixing device described in the above embodiments. The heating device according to the present disclosure is also applicable to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to the above heating device can reduce the temperature unevenness of the rotator and the heating member in the arrangement direction.

The image forming apparatus according to the present embodiments of the present disclosure is applicable not only to a color image forming apparatus 100 illustrated in FIG. 1 but also to a monochrome image forming apparatus, a copier, a printer, a facsimile machine, or a multifunction peripheral including at least two functions of the copier, printer, and facsimile machine.

Figure 21:
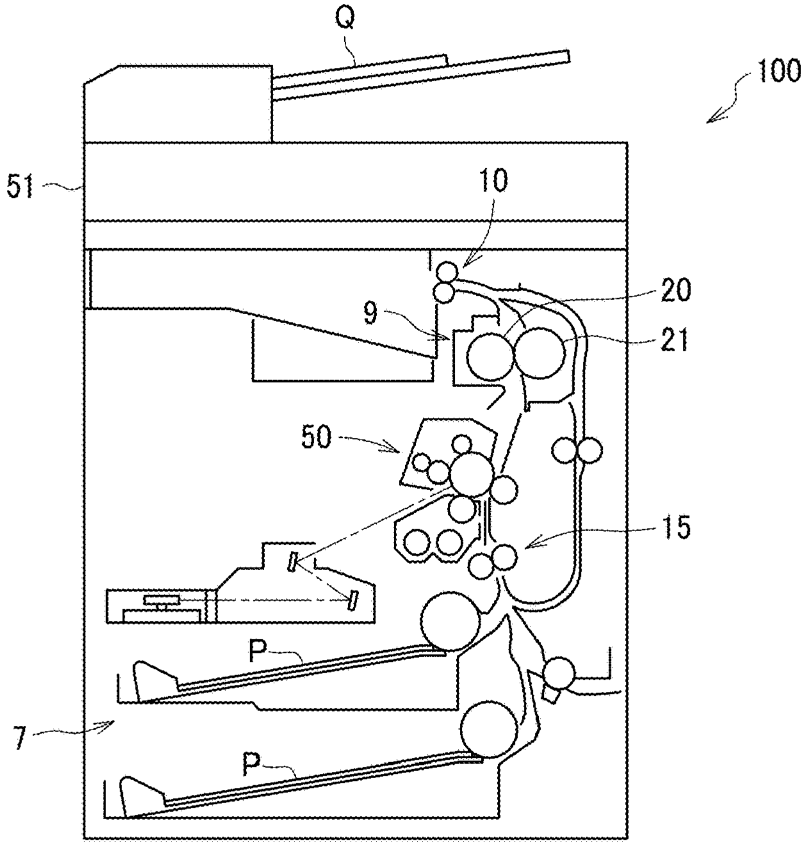
FIG. 21 is a schematic diagram illustrating a configuration of an image forming apparatus different from the image forming apparatus of FIG. 1.

For example, as illustrated in FIG. 21, an image forming apparatus 100 according to the present embodiment includes an image forming unit 50 including a photoconductor drum and the like, a sheet conveyer including a timing roller pair 15 and the like, a sheet feeder 7, a fixing device 9, a sheet ejection device 10, and a reading device 51. The sheet feeder 7 includes a plurality of sheet feeding trays, and the sheet feeding trays stores sheets of different sizes, respectively.

The reading device 51 reads an image of a document Q. The reading device 51 generates image data from the read image. The sheet feeder 7 stores a plurality of sheets P and feeds the sheet P to a conveyance path. The timing roller pair 15 conveys the sheet P on the conveyance path to the image forming unit 50.

The image forming unit 50 forms a toner image on the sheet P. Specifically, the image forming unit 50 includes the photoconductor drum, a charging roller, an exposure device, a developing device, a supply device, a transfer roller, a cleaning device, and a discharger. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing device of the above-described embodiment is omitted as appropriate.

Figure 22:
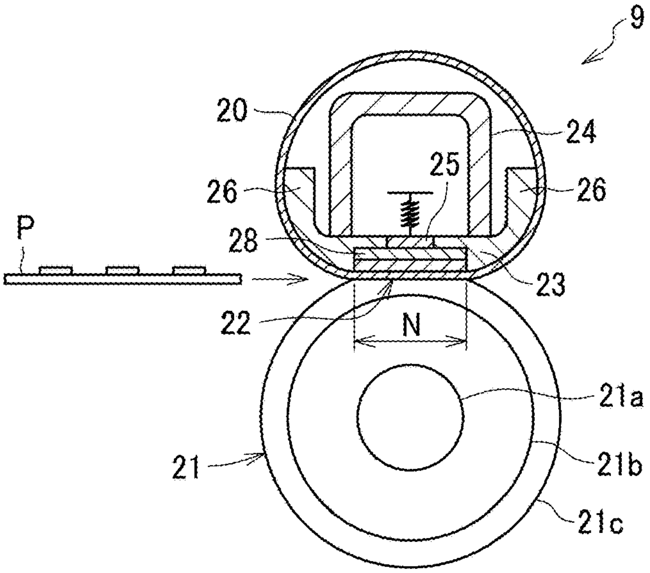
FIG. 22 is a schematic sectional view of a fixing device according to an embodiment of the present disclosure.

As illustrated in FIG. 22, the fixing device 9 includes a fixing belt 20, a pressure roller 21, a heater 22, a heater holder 23, a stay 24, a thermistor 25, and a first high thermal conduction member 28.

A fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and a release layer and does not include an elastic layer. The release layer is made of a heat-resistant film material made of, for example, a fluororesin. The outer loop diameter of the fixing belt 20 is about 24 mm.

The pressure roller 21 includes a cored bar 21*a*, an elastic layer 21*b*, and a release layer 21*c*. The pressure roller 21 has an outer diameter of 24 to 30 mm, and the elastic layer 21*b* has a thickness of 3 to 4 mm.

The heater 22 includes a base, a thermal insulation layer, a conductor layer including a resistive heat generator and the like, and an insulating layer, and is formed to have a 1 mm as a whole. A width Y of the heater 22 in the direction intersecting the arrangement direction is 13 mm.

Figure 23:
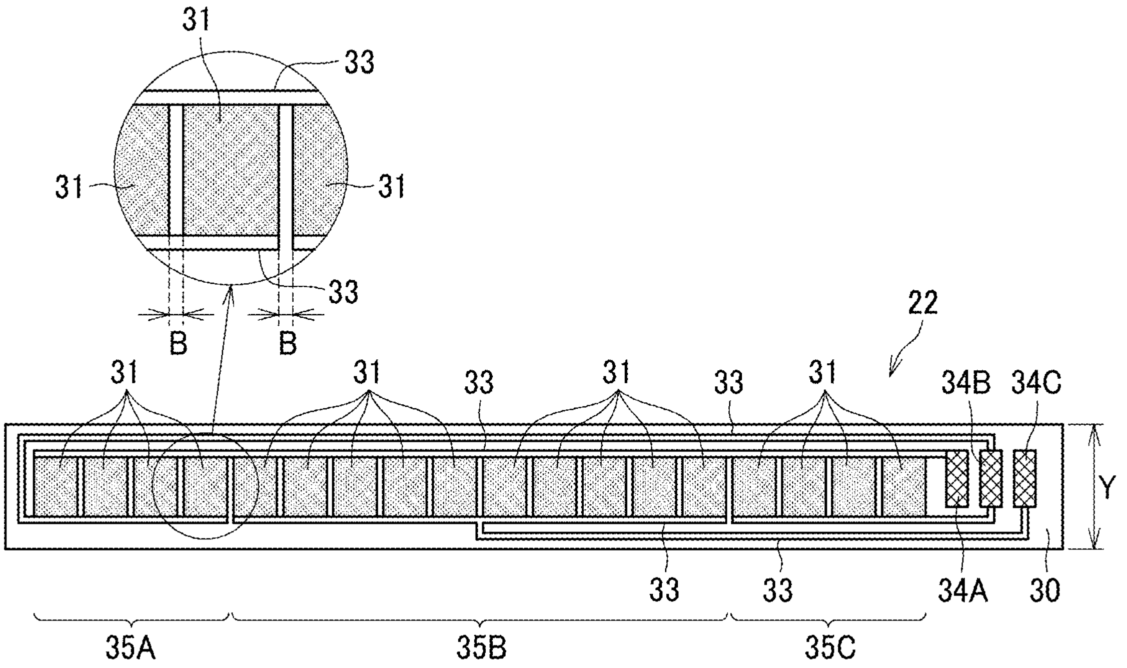
FIG. 23 is a plan view of a heater in the fixing device of FIG. 22.

As illustrated in FIG. 23, the conductor layer of the heater 22 includes a plurality of resistive heat generators 31 arranged in the arrangement direction, power supply lines 33, and electrodes 34A to 34C. As illustrated in the enlarged view of FIG. 23, the separation area B is formed between neighboring resistive heat generators of the plurality of resistive heat generators 31 arranged in the arrangement direction. The enlarged view of FIG. 23 illustrates two separation region B, but the separation area B is formed between neighboring the resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image to the small sheet, the heat generation portion 35B generates heat. When the fixing device 9 fixes the toner image to the large sheet, all the heat generation portions 35A to 35C generate heat.

Figure 24:
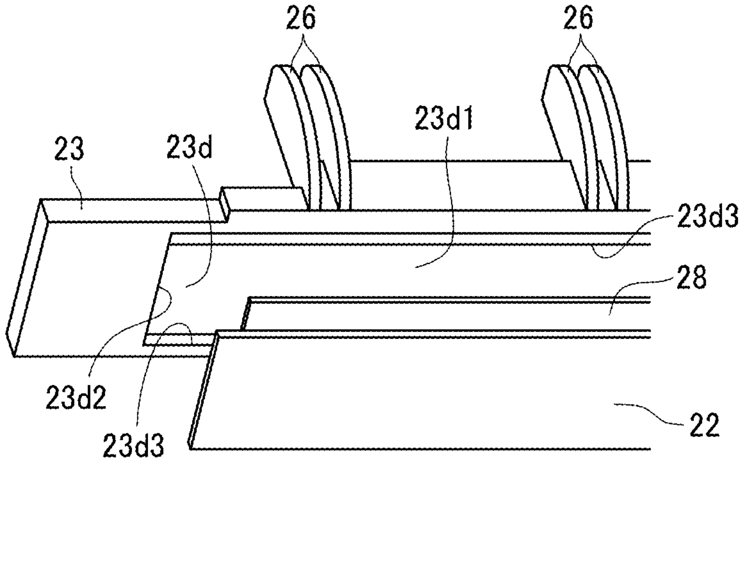
FIG. 24 is a perspective view of the heater and a heater holder.

As illustrated in FIG. 24, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the arrangement direction. The recessed portion 23*d* may have one wall 23*d*2. The walls 23*d*3 are both side surfaces of the recessed portion 23*d* in the direction intersecting the arrangement direction. The heater holder 23 has guides 26. The heater holder 23 is made of liquid crystal polymer (LCP).

Figure 25:
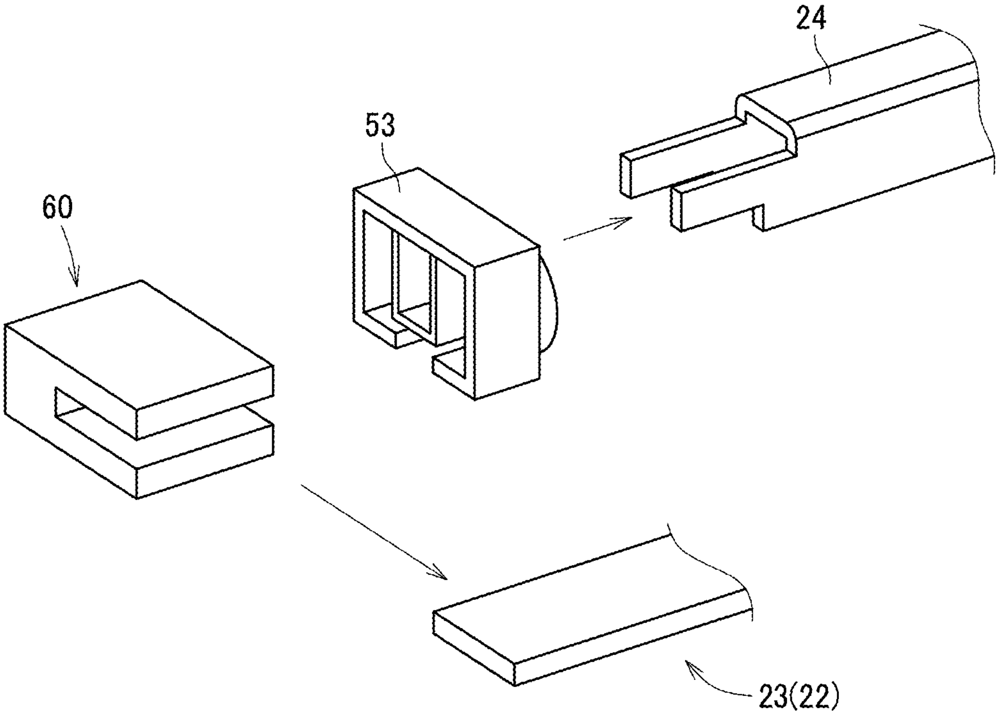
FIG. 25 is a perspective view of a connector attached to the heater.

As illustrated in FIG. 25, the connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically connected to the power supply provided in the image forming apparatus via the connector 60. The above-described configuration enables the power supply to supply power to the heat generation portion 35. Note that at least part of each of the electrodes 34 is not coated by the insulation layer and therefore exposed to secure connection with the connector 60.

The flange 53 contacts the inner circumferential surface of the fixing belt 20 at each of both ends of the fixing belt 20 in the arrangement direction to hold the fixing belt 20. The flange 53 is fixed to a housing of the fixing device 9. The flanges 53 are inserted into both ends of the stay 24 (see a direction indicated by arrow from the flange 53 in FIG. 25).

To attach to the heater 22 and the heater holder 23, the connector 60 is moved in the direction intersecting the arrangement direction (see a direction indicated by arrow from the connector 60 in FIG. 25). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portions to attach the connector 60 to the heater holder 23. The connector 60 is attached to one end of the heater 22 and one end of the heater holder 23 in the arrangement direction. The one end of the heater 22 and one end of the heater holder 23 are farther from a portion in which the pressure roller 21 receives a driving force from a drive motor than the other end of the heater 22 and the other end of the heater holder 23, respectively.

Figure 26:
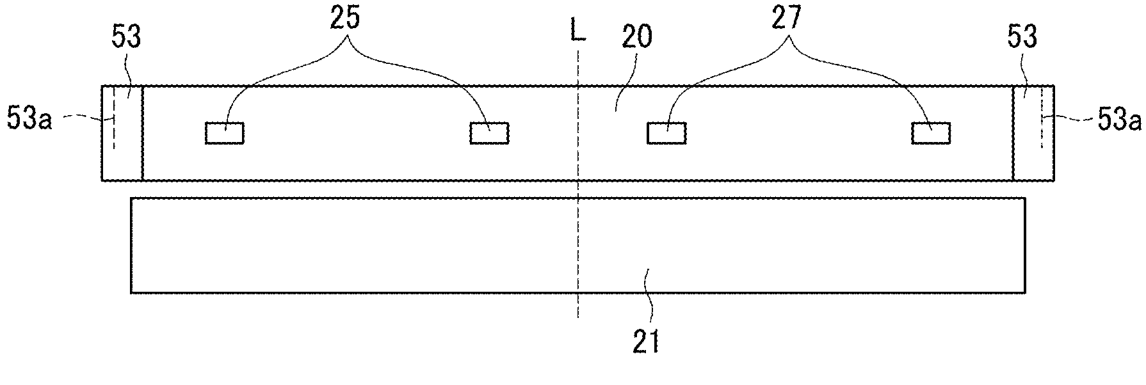
FIG. 26 is a schematic diagram illustrating an arrangement of thermistors and thermostats.

As illustrated in FIG. 26, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 26, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current flowing to the heater 22 in response to a detection of a temperature of the fixing belt 20 higher than a predetermined threshold value.

Flanges 53 are disposed at both ends of the fixing belt 20 in the arrangement direction and hold both ends of the fixing belt 20, respectively. The flange 53 is made of liquid crystal polymer (LCP).

Figure 27:
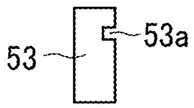
FIG. 27 is a schematic diagram illustrating a groove of a flange.

As illustrated in FIG. 27, the flange 53 has a slide groove 53*a*. The slide groove 53*a* extends in a direction in which the fixing belt 20 moves toward and away from the pressure roller 21. An engaging portion of a housing of the fixing device 9 is engaged with the slide groove 53*a*. The relative movement of the engaging portion in the slide groove 53*a* enables the fixing belt 20 to move toward and away from the pressure roller 21.

The above-described fixing device 9 including the first high thermal conduction member and the second high thermal conduction member facing the gap area between the neighboring resistive heat generators of the heater 22 also reduces the temperature unevenness of the heater 22 and the temperature unevenness of the fixing belt 20 in the arrangement direction. Therefore, the above-described structure prevents fixing unevenness and gloss unevenness in the image fixed on the sheet passing through the fixing device. Since the heater does not need to generate additional heat to secure sufficient fixing performance in the part of the heater facing the gap area between the resistive heat generators, energy consumption of the fixing device 9 can be saved.

The sheets P serving as recording media may be thick paper, postcards, envelopes, plain paper, thin paper, coated paper, art paper, tracing paper, overhead projector (OHP) transparencies, plastic film, prepreg, copper foil, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:
a rotator;
a heater including:
a base; and
a plurality of heat generators on the base in an arrangement direction and including neighboring heat generators in the arrangement direction, the arrangement direction being a longitudinal direction of the heater,
the heater having a gap area between the neighboring heat generators in the arrangement direction;
a heater holder; and
a second high thermal conductor existing at only a region facing the gap area and at least a part of each of the neighboring heat generators, the second high thermal conductor having a larger thermal conductivity in the arrangement direction than a thermal conductivity in a thickness direction of the second high thermal conductor,
wherein
the second high thermal conductor and the heater are different parts.

2. The heating device according to claim 1, further comprising
a plurality of first high thermal conductors
wherein the heater includes a plurality of gap areas disposed at intervals in the arrangement direction, and
wherein the plurality of first high thermal conductors are disposed at intervals in the arrangement direction and face the plurality of gap areas, respectively.

3. The heating device according to claim 1, further comprising
wherein the second high thermal conductor faces the gap area and has a higher thermal conductivity than the base.

4. The heating device according to claim 3,
wherein the second high thermal conductor is a graphite sheet.

5. A fixing device comprising the heating device according to claim 1.

6. An image forming apparatus comprising the fixing device according to claim 5.

7. The heating device according to claim 1, wherein a separation area between lines extending in a direction orthogonal to the arrangement direction from both ends of the gap area in the arrangement direction of the neighboring heat generators includes parts of the neighboring heat generators.

8. The heating device according to claim 7, wherein, as viewed from the direction orthogonal to the arrangement direction, the gap area is completely filled by the parts of the neighboring heat generators.

9. The heating device according to claim 1, further comprising:
a plurality of second high thermal conductors disposed on a plurality of portions of the heater holder in the arrangement direction;
wherein each of the second high thermal conductors is disposed at a position corresponding to the gap area in the arrangement direction and faces at least a part of each of the neighboring heat generators in the arrangement direction.

10. The heating device according to claim 9, wherein a recessed portion of the heater holder includes a plurality of holes in which the second high thermal conductors are disposed, and clearances are formed between the heater holder and both sides of each of the high thermal conductors in the arrangement direction.

11. The heating device according to claim 1, wherein the plurality of heat generators each has a rectangular shape or a parallelogram shape, and the plurality of heat generators are arranged in a straight line in the longitudinal direction of the heater.

12. The heating device according to claim 1, further comprising a thermistor disposed in a central region in the arrangement direction of the heater and another thermistor disposed in one end portion of the heater in the arrangement direction,
wherein the another thermistor is a power cut-off device which cuts off power supply to at least one of the plurality of heat generators when a temperature detected by the another thermistor becomes a predetermined temperature or higher.

13. The heating device according to claim 1, wherein each of the heat generators includes a linear portion folded back to form a parallelogram shape.

14. The heating device according to claim 1, wherein the heater further includes a first high thermal conductor facing the gap area and having a higher thermal conductivity than the base.

15. The heating device according to claim 14,
wherein the first high thermal conductor faces at least a part of each of the neighboring heat generators.

16. The heating device according to claim 14, further comprising
a thermal insulation layer between the heater holder and the first high thermal conductor,
wherein at least a part of the thermal insulation layer faces the plurality of heat generators in a direction along a surface of the base and a direction intersecting the arrangement direction of the plurality of heat generators.

17. The heating device according to claim 14,
wherein the first high thermal conductor faces an entire area of the plurality of heat generators in the arrangement direction of the plurality of heat generators.

18. The heating device according to claim 14,
wherein the heater holder has an arrangement direction regulator to restrict a movement of the first high thermal conductor in the arrangement direction of the plurality of heat generators.

19. The heating device according to claim 1, wherein the gap area between the neighboring heat generators in the arrangement direction is equal to or shorter than 5 mm.

20. The heating device according to claim 19, wherein the gap area between the neighboring heat generators in the arrangement direction is in a range of 0.2 mm or more and equal to or shorter than 5 mm.

* * * * *